United States Patent [19]

Vollers

[11] Patent Number: 4,730,137

[45] Date of Patent: Mar. 8, 1988

[54] ENERGY CONVERSION SYSTEM

[76] Inventor: Gary L. Vollers, 11471 Tampa Ave., Unit 149, Northridge, Calif. 91326

[21] Appl. No.: 926,229

[22] Filed: Nov. 3, 1986

[51] Int. Cl.$^4$ ............................................... H02N 7/00
[52] U.S. Cl. .................................................... 310/306
[58] Field of Search .................................. 310/306, 307

[56] References Cited

U.S. PATENT DOCUMENTS

| | | | |
|---|---|---|---|
| 380,100 | 3/1888 | Edison | 310/306 X |
| 389,125 | 9/1888 | Weston | 310/306 X |
| 481,999 | 9/1892 | Berliner | 310/306 |
| 764,518 | 7/1904 | Bremer | 310/306 |
| 2,016,100 | 10/1935 | Schwartzkopf | 310/306 |
| 2,391,313 | 12/1945 | Hindle . | |
| 3,316,415 | 4/1967 | Taylor | 310/306 X |
| 4,230,963 | 10/1980 | Kurpanek . | |

FOREIGN PATENT DOCUMENTS 0079266  5/1982  Japan .

Primary Examiner—Donovan F. Duggan
Attorney, Agent, or Firm—William W. Haefliger

[57] ABSTRACT

Motion generating apparatus comprising:
(a) first and second structures which are relatively rotatable,
(b) magnetic material associated with one of said structures and characterized as having a first magnetic state at a high temperature and a second magnetic state at a low temperature,
(c) a magnet associated with the other of said structures and having a pole to produce flux that intercepts said material as said structures relatively rotate,
(d) first means to transfer heat to cause said material to vary in temperature between said high and low temperatures so that magnetic force is exerted on the rotating structure as said material relatively passes in proximity to said magnet, thereby producing torque casing the rotating structures to rotate, and
(e) other means to transfer heat from the magnetic material to fluid media.

15 Claims, 4 Drawing Figures .

ENERGY CONVERSION SYSTEM

BACKGROUND OF THE INVENTION

This invention relates generally to systems utilizing the difference in magnetic properties of certain materials, at different temperatures, to produce motion such as rotation and to derive other forms of energy.

There is a need for simple apparatus for generating power by utilizing heat such as solar heat, or flame heat. The present invention meets that need through use of magnetic material which is caused to change in temperature above and below the Curie point, and in the manner as will be described.

SUMMARY OF THE INVENTION

It is a major object of the invention to provide motion generating apparatus meeting the above need. Basically, the apparatus comprises (a) first and second structures which are relatively rotatable, (b) magnetic material associated with one of said structures and characterized as having a first magnetic state at a high temperature and a second magnetic state at a low temperature, (c) means to transfer heat to cause said material to vary in temperature between said high and low temperatures so that magnetic force is exerted on the rotating structure as said material relatively passes in proximity to said magnet, thereby producing torque causing the rotating structure to rotate, (d) and means to transfer heat from the magnetic material to other media.

As will appear, the magnetic material may be integral with the one structure which may comprise a rotor; and the heat transfer means may comprise a flame source or a solar energy source positioned to heat the magnetic material as it relatively passes close to the magnet. For increased efficiency, heat is withdrawn from the rotating magnetic material at circularly spaced locations; and heat is transferred to fluid media such as a liquid bath, from which heat may be transferred to air in a forced air duct. Also, insulating material, which is non magnetic, may be employed in association with the magnetic material, and the latter may be deployed as a thin strip to be rapidly heated. Finally, a power take-off may be provided in association with the rotated structure.

These and other objects and advantages of the invention, as well as the details of an illustrative embodiment will be more fully understood from the following specification and drawings, in which:

DRAWING DESCRIPTION

DETAILED DESCRIPTION

Figure 1:
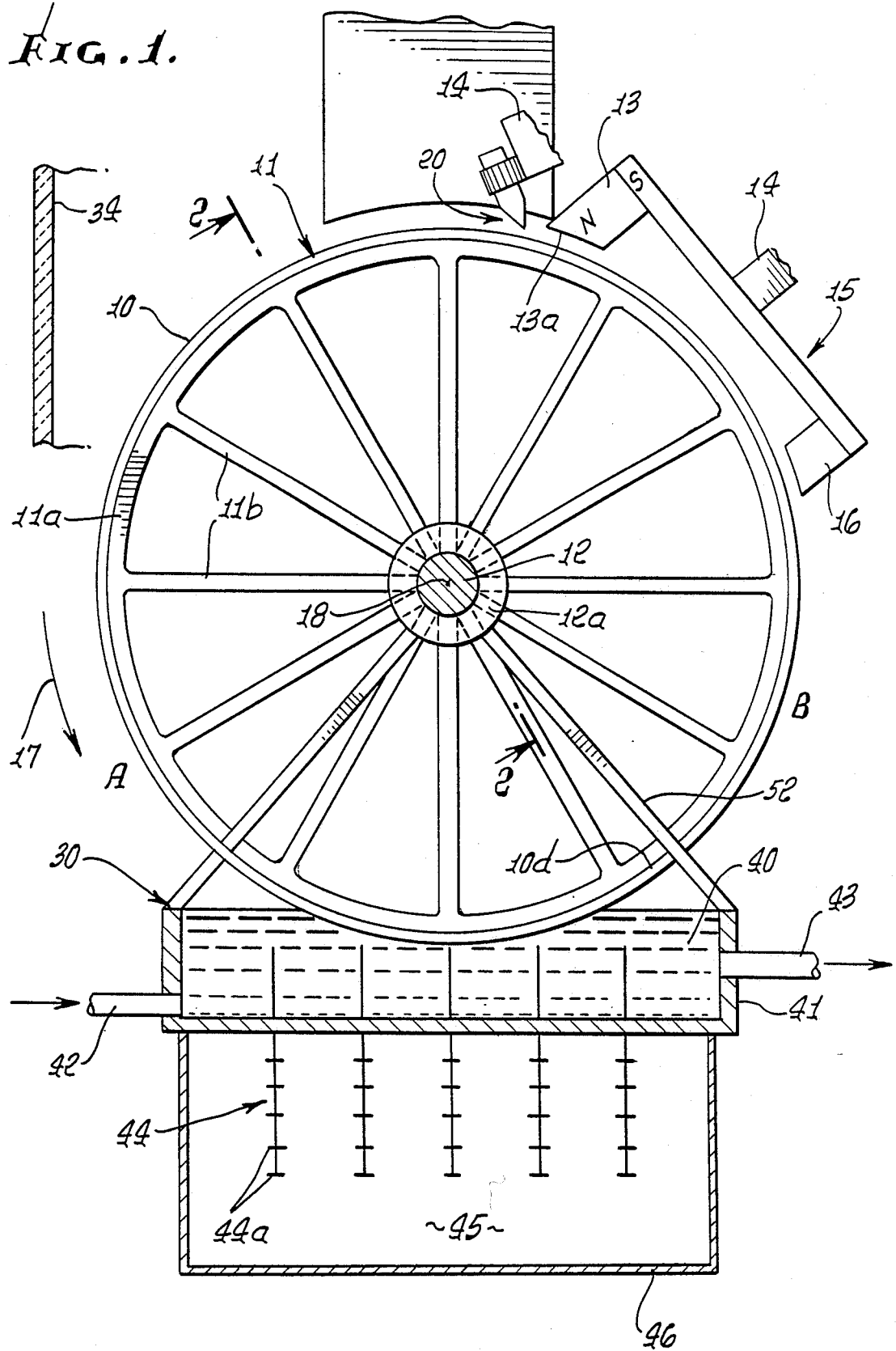
FIG. 1 is a plan view of apparatus incorporating the invention.
Figure 2:
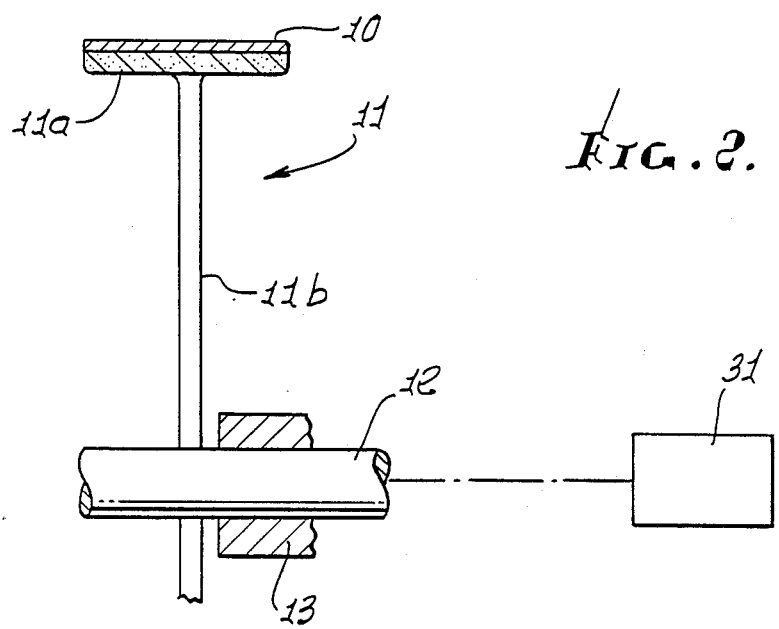
FIG. 2 is a side elevation on lines 2—2 of FIG. 1.

In the drawings, the motion generator shown includes first and second structures which are relatively rotatable. Magnetic material 10 is associated with one of the structures, as for example a rotor 11 mounted on a shaft 12 in turn mounted in a suitable bearing 12a. Material 10 may advantageously take the form of an annular rim mounted on an insulative annular wheel 11a having spokes 11b connected to shaft 12. The wheel and spokes may consist of molded glass fiber and resin such as epoxy. Material 10 is characterized as having a first magnetic state at a relatively high temperature, as for example above a Curie temperature, and a second magnetic state at a relatively lower temperature, as for example below the Curie temperature. One such material is Ni,Fe alloy, whose Curie temperature is about 170° C. Material 10 may be annularly continuous, or may be spaced at intervals about the rotor axis.

A magnet 13 is associated with the other of the first and second structures, as for example fixed support 14. The magnet has a pole 13a to produce flux that intercepts the magnetic material as the two structures relatively rotate. Thus, for example, the magnet may be a permanent magnet, and have a North pole located very close to the surface of the rotor so that the magnetic material 10 rotates into close proximity to the magnet pole, i.e. with less than 0.100 inch gap therebetween. Accordingly, the flux from the magnet tends to change the state of magnetization of the material 10. Also shown are pole piece 15, and magnet 16 to complete the magnetic flux circuit. One of these may consist of FeNi.

Means is provided to locally transfer heat to the material 10 to cause the latter to vary in temperature between the aforementioned high and low temperatures, so that magnetic force is exerted on the rotating structure as the material passes in proximity to the magnet pole, thereby producing torque causing the structure to rotate. As shown, the heater 20 is located to quickly heat the magnetic material increments 10 as it or they pass or emerge beyond the magnet 13, during rotation in direction of arrow 17.

Assuming the magnetic material 10 is at a reduced temperature $T_2$ below the Curie point as it approaches the magnet 13, its magnetic state is such as to be attracted toward the magnet 13. Then, as it emerges from beneath or past the magnet and is quickly heated to temperature $T_1$ above the Curie point, its magnetic state is changed so as not to be attracted by the magnet, whereby reverse torque on the rotor is eliminated or substantially reduced. Accordingly, net torque on the rotor causes the rotor to rotate and to drive shaft 12 which in turn drives a fan, gear box, etc. for power take-off as indicated at 31. The magnetic state of the material 10 may even be reversed by such heating to cause a repulsion effect between the magnet and material 10, adding torque to the rotor causing it to rotate in the same direction 17. Insulative material of wheel 11a blocks heat loss from the magnetic material as it rotates above a heat exchanger 30.

Figure 3:
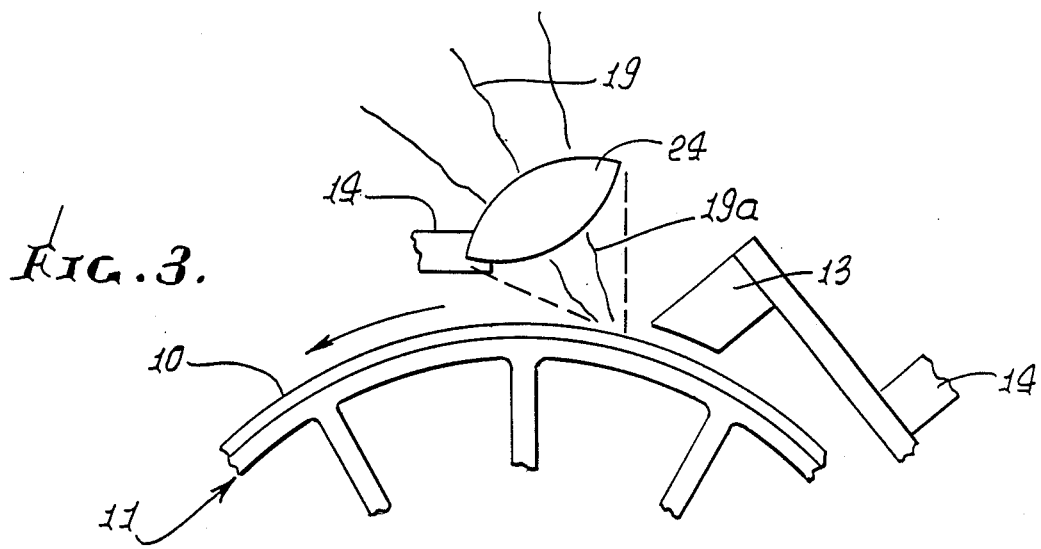
FIG. 3 is a fragmentary view showing solar ray heating of magnetic material.

The means to heat the magnetic material may take various forms, including for example a flame source indicated at 20 carried by frame or support 14, whereby the magnet and flame source may be fixed, and the magnetic material 10 may rotate with the rotor. Alternatively, the magnetic material may have fixed positions, and the flame source 20 and magnet may rotate with support 14, about an axis which is the same as the axis of rotation 18 of the illustrated rotor 11. Another form of means to heat the magnetic material affixed to the rotor is shown in FIG. 3 to comprise solar ray concentrating means such as a lens 24 carried by fixed support 14, and receiving solar rays 19 convergent at 19a toward the magnetic rim 10.

Also shown is an insulative housing 34 about the wheel to block heat loss from the magnetic material. This reduces heat loss from material 10, and enables faster heating by the source 20 so that more efficient torque transfer to the rotor is achieved. Wheel 11a may for example alternatively comprise ceramic, to withstand high temperature, and may be attached to the inner side of the rotor 10, as shown. It does not materially inhibit radiation cooling of the material 10 to below the Curie point, as the rotor rotates to carry the material 10 back to a point of close approach to the magnet 13, for magnetic attraction toward the magnet at that point, i.e. such cooling restores the magnetic state of the material 10 so as to be attracted, as described.

FIG. 1 shows the flat strip of magnetic material 10 as having thickness less than about 0.100 inches and between 0.060 and 0.070 for best results. As a result, it cools rapidly after being heated.

Figure 4:
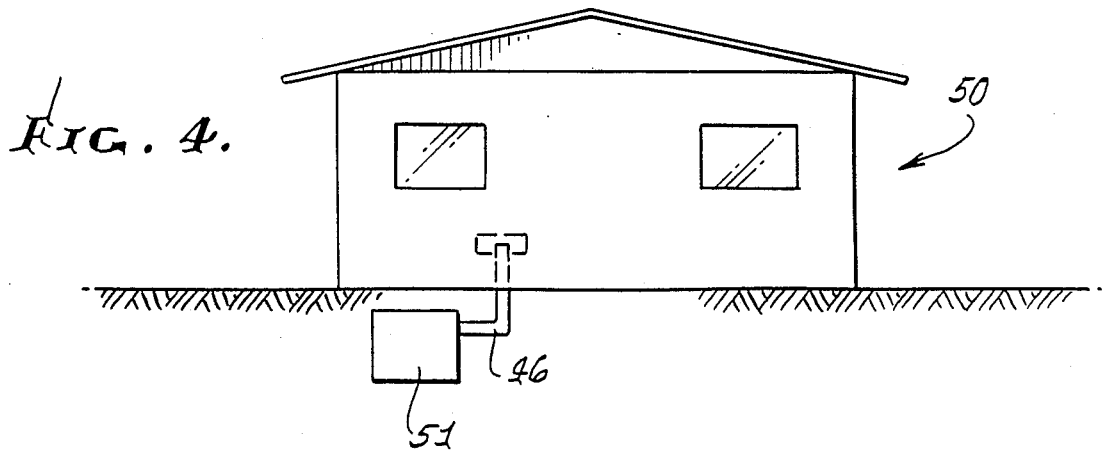
FIG. 4 is a view showing a home heated by a furnace of the type indicated in FIG. 1.

FIG. 1 also shows a liquid bath 40 below the rotor, and into which the heated magnetic material dips, temporarily, as the rotor rotates. Then, heat is transferred to the liquid 40, which may consist of oil which does not vaporize upon contact with the hot material 10 at about 350° F. for example. Hot liquid may be circulated to and from a tank 41 containing the liquid bath, as via inlet 42 and outlet 43, for heating external means. Also shown are heat transfer devices such as heat pumps 44 that project into the bath to be heated, and that also project outside the tank as into interior 45 of a duct 46. Air passing through the duct is then heated by devices 44, which may be finned as at 44a for better heat transfer to the air. The material 10 after leaving the bath at 10d may be at around 150° F. Thus, the device is well adapted to operate as a home furnace, heating air in furnace duct 46. FIG. 4 shows a home 50 heated by such a furnace 51, corresponding to FIG. 1.

It is found that the power take off 31 may be set to regulate the rotary speed of shaft 12, for maximum efficiency; i.e. the shaft and rim 10 should not rotate so fast as to substantially diminish the magnetic repulsion effect near the magnet 13a; and the shaft should not rotate so slowly as to substantially reduce power output.

Support arms 52 support the bearing 12a. In region A the temperature of the material 10 may be around 350° F., and in region B, around 150° F.

I claim:

1. In a motion generator, the combination comprising
   (a) first and second structures which are relatively rotatable,
   (b) a strip of magnetic material associated with one of said structures and characterized as having a first magnetic state at a high temperature and a second magnetic state at a low temperature, said magnetic material strip extending annularly on said one structure which is a heat insulative rotor,
   (c) a magnet associated with the other of said structures and having a pole to produce flux that intercepts said material as said structures relatively rotate,
   (d) first means to transfer heat to cause said material to vary in temperature between said high and low temperatures so that magnetic force is exerted on the rotating structure as said material relatively passes in proximity to said magnet, thereby producing torque causing the rotating structures to rotate, and
   (e) other means to transfer heat from the magnetic material to fluid media, said other means comprising a liquid bath below the rotor, and into which only the lowermost extents of the rotor and magnetic material dips during rotor rotation, transferring heat from the magnetic material to the bath liquid, and heat transfer means contacting the bath liquid to transfer useful heat therefrom.

2. The combination of claim 1 wherein said material is integral with said one structure.

3. The combination of claim 1 wherein said first means is positioned to transfer heat to the material as it relatively passes close to the magnet.

4. The combination of claim 1 wherein said first means comprises a flame source.

5. The combination of claim 1 including a power take-off associated with said relatively rotating structure.

6. The combination of claim 1 including a pole piece associated with the magnet to provide a flux return path, the pole piece approaching the relatively rotating structure at a point spaced from said magnet pole.

7. The combination of claim 1 including nonmagnetic insulating material at the side of the magnetic material opposite said pole to block heat loss from said magnetic material at a location proximate the magnet.

8. The combination of claim 7 wherein said magnetic material has thickness less than 0.100 inch.

9. The combination of claim 1 wherein said magnetic material is carried by said one structure at multiple circularly spaced locations whereby multiple torque exertions are exerted on the relatively rotating structure during each revolution thereof.

10. The combination of claim 1 wherein said first means is also on said other structure.

11. The combination of claim 1 wherein said first means comprises solar ray concentrating apparatus.

12. The combination of claim 1 wherein said rotor has a horizontal axis of rotation above the bath and above the heat transfer means.

13. The combination of claim 1 wherein the bath consists of oil.

14. The combination of claim 1 including a tank containing said bath, said heat transfer means comprising heat pump devices extending in the bath and to a duct region outside the tank; the duct passing air in heat transfer relation with said devices.

15. The combination of claim 14 which comprises a home furnace.

* * * * *